(12) United States Patent
Gayles et al.

(10) Patent No.: US 10,566,800 B2
(45) Date of Patent: Feb. 18, 2020

(54) METHOD FOR CONTROLLING A GENSET SYSTEM

(71) Applicant: Caterpillar Inc., Peoria, IL (US)

(72) Inventors: Ronald Christopher Gayles, Peoria, IL (US); Edward Maurer Schroeder, Germantown Hills, IL (US); Stephen Charles Nofsinger, Washington, IL (US); Josenia Yuen-Sai Gerdes, Dunlap, IL (US); Andrew W Black, Larne (GB)

(73) Assignee: Caterpillar Inc., Peoria, IL (US)

( * ) Notice: Subject to any disclaimer, the term of this patent is extended or adjusted under 35 U.S.C. 154(b) by 153 days.

(21) Appl. No.: 15/148,326

(22) Filed: May 6, 2016

(65) Prior Publication Data
US 2017/0324250 A1 Nov. 9, 2017

(51) Int. Cl.
*H02J 1/00* (2006.01)
*H02J 3/46* (2006.01)

(52) U.S. Cl.
CPC .................... *H02J 3/46* (2013.01)

(58) Field of Classification Search
CPC ..... F02B 63/04; H02J 3/32; H02J 3/46; F02D 29/06
See application file for complete search history.

(56) References Cited

U.S. PATENT DOCUMENTS

| | | | |
|---|---|---|---|
| 6,351,692 B1 | 2/2002 | Eaton et al. | |
| 6,555,929 B1 | 4/2003 | Eaton et al. | |
| 8,301,312 B2 | 10/2012 | Saikkonen et al. | |
| 8,358,036 B2 | 1/2013 | Dozier et al. | |
| 8,519,565 B2 | 8/2013 | Dozier et al. | |
| 8,761,953 B2 | 6/2014 | Friedrich et al. | |
| 8,841,787 B1* | 9/2014 | Folken | H02P 9/42 290/40 E |
| 2011/0320053 A1 | 12/2011 | Dozier et al. | |
| 2014/0188689 A1 | 7/2014 | Kalsi et al. | |
| 2015/0372488 A1* | 12/2015 | Maruhashi | H02J 3/14 700/287 |
| 2016/0359328 A1* | 12/2016 | Hunt | H02J 3/32 |

* cited by examiner

*Primary Examiner* — Sibin Chen
(74) *Attorney, Agent, or Firm* — Miller, Matthias & Hull

(57) ABSTRACT

A method for controlling a genset system is provided. The method includes recognizing a communication failure between one or more gensets of a plurality of gensets and a control system and determining an operating state of each of the one or more gensets prior to the communication failure. The method further includes operating the genset system, upon communication failure, according to a load control scheme. The load control scheme includes determining an available power of the genset system based on the determined operating state of each of the one or more gensets and coupling one or more loads to the genset system based on the available power.

20 Claims, 2 Drawing Sheets

METHOD FOR CONTROLLING A GENSET SYSTEM

TECHNICAL FIELD

The present disclosure relates to a genset system, and more particularly to a method for operating a genset system having a plurality of gensets when a communication failure between one or more of the gensets of the plurality of gensets and a control system of the genset system occurs.

BACKGROUND

A generator set, or genset, generally comprises a primary power source, such as an internal combustion engine, or the like, as well as an electric machine, such as induction generators, switched reluctance generators, or any other suitable electric machine commonly employed to convert mechanical energy, or other forms of energy, into electrical energy. In typical implementations, a plurality of gensets are arranged to communicate generated electrical energy through a shared or common bus that is further supplied to one or more connected loads. The loads may be connected to the common bus, by a central controller, based on total power generated by the gensets.

As, each of the gensets communicates with the central controller, the central controller is aware of the total power generated by the gensets. Therefore, the central controller couple one or more loads to the common bus based on the total power generated by the gensets. However, in an event when communication between one or more gensets and the central controller is lost, the central controller may not be aware of the accurate value of the total power generated by the gensets. Therefore, the central controller may couple one or more loads to the common bus such that total load on the common bus is more or less than the total power generated by the gensets.

In a scenario, when the total load coupled to the common bus is less than the power generated by the gensets, the genset system remains under-utilized which may not be desirable. In another scenario, when the total load coupled to the common bus is more than the total power generated by the gensets, undue stress may come on the common bus, the gensets and/or electrical components associated with the gensets. This may cause electrical failure of the gensets, the common bus, and/or the electrical components associated with gensets.

U.S. Pat. No. 8,301,312 discloses a genset system having a plurality of gensets, which are connected to a local power transmission network by two switches. Further, the plurality of gensets communicate data with each other via a can bus. The patent further discloses controlling the genset according to a droop control based on the position of the two switches, when the genset has lost communication with another gensets. However, the patent does not disclose controlling a genset system when the communication is lost between one or more gensets and a central controller.

SUMMARY OF THE INVENTION

According to an aspect of the disclosure, a method for controlling a genset system is provided. The method includes recognizing a communication failure between one or more gensets of a plurality of gensets and a control system and determining an operating state of each of the one or more gensets prior to the communication failure. The method further includes operating the genset system, upon communication failure, according to a load control scheme. The load control scheme includes determining an available power of the genset system based on the determined operating state of each of the one or more gensets and coupling one or more loads to the genset system based on the available power According to another aspect of the disclosure, a genset system is provided. The genset system includes a plurality of gensets, a common bus, and a control system. The common bus is configured to be coupled to each of the plurality of gensets. Also, the common bus is configured to communicate electrical power generated by the plurality of gensets to one or more loads. Further, the control system is in communication with the plurality of gensets, the common bus, and the one or more loads. The control system is configured to recognize a communication failure between one or more gensets of the plurality of gensets and determine an operating state of each of the one or more gensets prior to the communication failure. The control system is further configured to operate the genset system, upon communication failure, according to a load control scheme. The load control scheme includes determining an available power of the genset system based on the determined state of each of the one or more gensets and coupling one or more loads to the common bus based on the available power.

According to another aspect of the disclosure, a control system for controlling a genset system is provided. The control system includes a controller. The controller is in communication with a plurality of gensets, a common bus, and one or more loads. The controller is configured to recognize a communication failure between one or more gensets of the plurality of gensets and determine an operating state of each of the one or more gensets prior to the communication failure. The controller is further configured to operate the genset system, upon communication failure, according to a load control scheme. The load control scheme includes determining an available power of the genset system based on the determined state of each of the one or more gensets and coupling one or more loads to the common bus based on the available power.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts. Also, wherever possible, the same reference numbers will be used throughout the drawings to refer to the same or the like parts.

Figure 1:
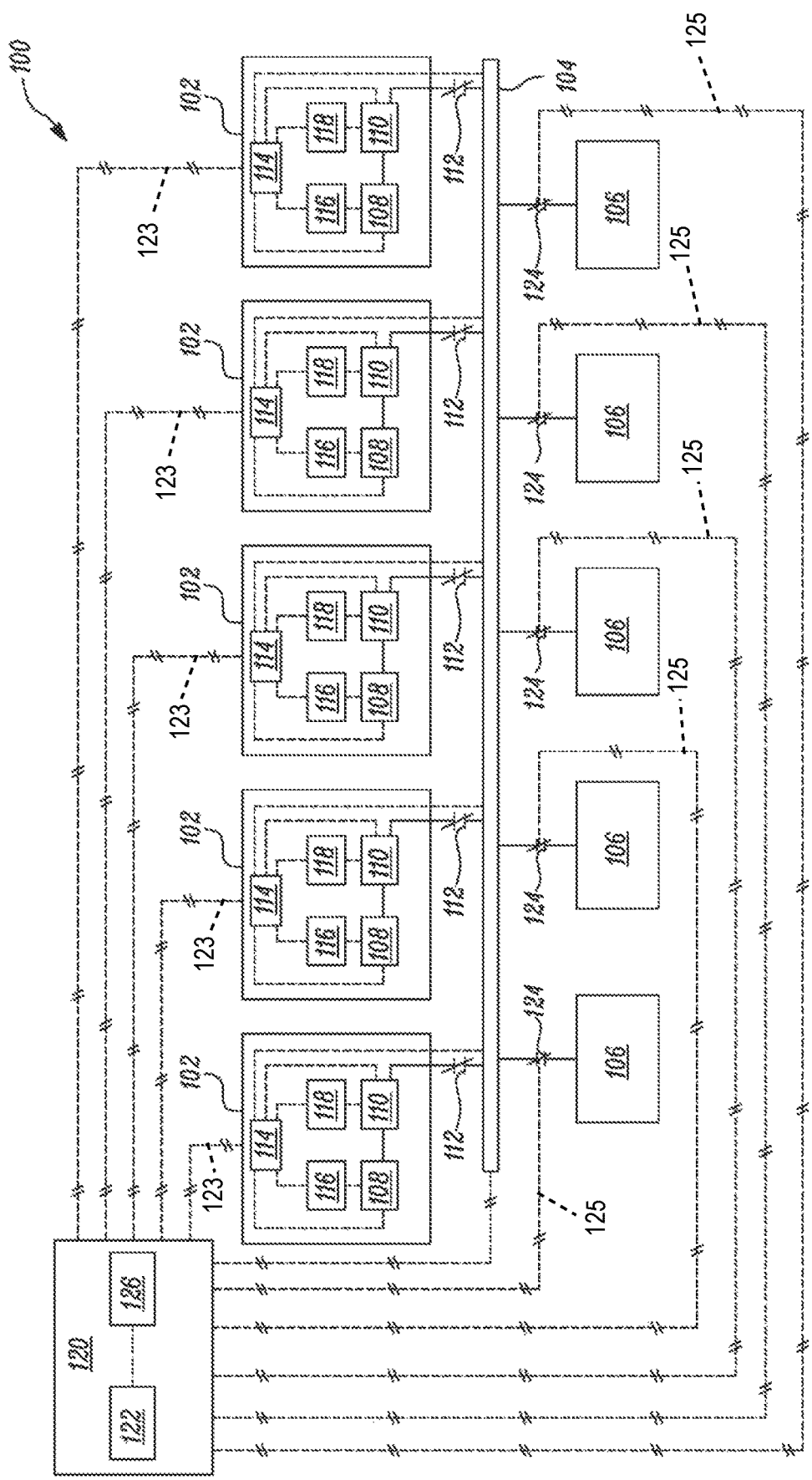
FIG. 1 illustrates a diagrammatic view of a genset system provided with an exemplary control system, in accordance with an embodiment of the disclosure.

Referring to FIG. 1, one exemplary embodiment of a system of generator sets, or a genset system 100, is diagrammatically illustrated. As shown, the genset system 100 may generally include a plurality of gensets 102 which are coupled to a common bus 104 and configured to supply electrical power to one or more loads 106 via the common bus 104. Each genset 102 may generally include an engine 108 and an electric machine 110. The engine 108 may include an internal combustion engine or any other comparable prime mover suitable for supplying mechanical energy, or any other suitable source of energy, to the electric machine 110. The electric machine 110 may employ an induction machine, a switched reluctance machine, or any other suitable electric motor or generator commonly used in the art for converting energy supplied by the engine 108 into electrical energy.

Gensets 102 are not limited to the configuration shown in FIG. 1. The gensets 102 may include components other than engines 108 and electric machines 110 for producing electricity. For example, one or more of gensets 102 may be a fuel cell.

Each genset 102 may also include various control components. For example, each genset 102 may have a switch 112 connected between the output of its electric machine 110 and the common bus 104. Each switch 112 may have any configuration that allows selectively electrically connecting the output of the associated electric machine 110 to the common bus 104. In an embodiment, the switch 112 may include a circuit breaker.

In addition to the switches 112, the control components of generator sets or gensets 102 may include one or more information-processing and control devices. For example, each of the genset 102 may include an associated unit control device 114. Unit control device 114 may include various types of information-processing components, including, but not limited to, hardwired control circuits (not shown) and/or microprocessors (not shown). Additionally, in some embodiments, the unit control device 114 may include an operator interface (not shown) through which an operator may communicate with the unit control device 114. Each genset 102 may have its unit control device 114 operatively connected to its engine 108, its electric machine 110, and its switch 112. Accordingly, the unit control device 114 of each genset 102 may monitor and/or control one or more aspects of the operation of the engine 108, the electric machine 110, and the switch 112 of that genset 102. In an embodiment, each of the unit control devices 114 may operate associated switches 112 to connect or disconnect associated electric machine 110 or genset 102 with the common bus 104.

The unit control device 114 may also connect to various components that supply it with information about various other aspects of the operation of the genset 102. The unit control device 114 may receive information about one or more characteristics of the electricity generated by its genset 102, such as the voltage, current, phase, and/or frequency.

Additionally, each of the genset 102 includes an engine control switch 116 and a synchronization switch 118. Each of the engine control switch 116 and the synchronization switch 118 may be in communication with its unit control device 114. The engine control switch 116 may be actuated such as to operate associated engine 108 in various modes such as a RUN mode, an AUTO mode, and an OFF mode. Upon activation of the RUN mode by appropriately actuating the engine control switch 116, associated engine 108 starts functioning and delivers power to operate associated electric machine 110. In the AUTO mode, upon activation, the associated engine 108 is in standby and starts operating and delivering power to the electric machine 110 when commanded by the unit control device 114. The OFF mode refers to a mode in which the associated engine 108 is switched off and not delivering power or not ready to deliver power when commanded by the unit control device 114. Each of the engine control switches 116 is in communication with an associated unit control device 114 and transfers information about activation of the engine control switch 116 in one of its various positions. In an embodiment, the engine control switch 116 may be a physical button having three detent positions. In an embodiment, the engine control switch 116 may be included in the operator interface (not shown) of the associated genset 102. In an embodiment, the engine control switch 116 and the synchronization switch 118 may be instructions executed by the unit control device 114. In such case, the instructions may be stored in a memory (not shown) of the unit control device 114.

Further, the synchronization switch 118 is configured to operate in an AUTO mode and an OFF mode. When the synchronization switch 118 is positioned in the AUTO mode, the voltage, current, frequency, and any other parameter associated with the electrical output of the associated electric machine 110 is synchronized with the voltage, current, frequency of the electricity flowing in the common bus 104. Each synchronization switch 118 is communication with an associated unit control device 114 such that the associated unit control device 114 receives information regarding a state of the synchronization switch 118. The unit control device 114 may accordingly control its genset 102 based on the state of the synchronization switch 118. Also, each of the unit control device 114 may store information about the state of the associated engine control switch 116 and associated synchronization switch 118.

Additionally, each of the unit control devices 114 may store information regarding one or more warning events related to its genset 102. The one or more warning events may be generated during the current operation or previous operation of the gensets 102. One of the warning events may be associated with the readiness of the genset 102 to automatically parallel with the common bus 104. The readiness of a genset 102 to automatically parallel to the common bus 104 refers to readiness of the genset 102 for connection to the common bus 104. The connection of the genset 102 may be achieved with the common bus 104 when the parameters of the electricity produced by the genset 102 such as voltage and frequency are in synchronization with the electricity present in the common bus 104 before the connection occurs.

Further, the warning events may also be associated with a failure of a synchronization of the genset 102 with the common bus 104. Also, each of the unit control devices 114 stores information about the state of each of the warning events for its genset 102. The state information may be stored as true or false.

Also, the unit control device 114 may receive and store information regarding the operation of an associated engine 108 at idle or at a rated power. Further, the unit control device 114 may also receive and store information regarding any active engine shutdown events of the engine 108 and/or the electric machine 110 of its genset 102.

The genset system 100 further includes a control system 120 in communication with each of the gensets 102, the common bus 104, and the loads 106. The control system 120 includes one or more controllers 122 configured to, among other things, operate the genset system 100 according to a load control scheme in the event communication with one or more gensets 102 of the genset system 100 is lost, during normal operation. The controller 122 may be in communication with each of the gensets 102 via a communication link 123 such as an Ethernet based communication link. Although an Ethernet based communication link is contemplated, any other suitable communication link known in the art would also apply.

In an embodiment, the controller 122 may be in communication with the associated unit control device 114 of each of the gensets 102 to receive information related to an operating state of the each of the gensets 102. The operating state of the genset 102 may include such as, but not limited to, a state of the engine control switch 116, a state of the synchronization switch 118, a state of an engine power output. The controller 122 may be configured to continuously record and store the operating state of each of the gensets 102. The stored information regarding the operating state of each of the gensets 102 may be available for retrieval by the controller 122. In an exemplary embodiment, the controller 122 may store information regarding current and past operating states of each of the gensets 102.

In an embodiment, the controller 122 may independently communicate with each of the components of the genset 102 such as the engine 108, the electric machine 110, switch 112, unit control device 114, the engine control switch 116, synchronization switch 118 etc. and receive and store various information related to operating mode or states of each of the components. Further, the controller 122 may control the gensets 102 or the associated components based on the received operating state. Additionally or optionally, the controller 122 may also be in communication with each of the switches 112 to control and manipulate coupling of associated gensets 102 to the common bus 104. In the illustrated embodiment, when the switches 112 are controlled by the associated unit control devices 114, the information related to actuation of the switches 112 is communicated to the controller 122 by the associated unit control devices 114.

Further, the control system 120 may include an operator interface (not shown) through which an operator may communicate with the controller 122. The operator may input a priority order or sequence for the each of the loads 106 according to which the loads 106 are to be connected with the common bus 104. Further, each of the loads 106 may be coupled to the common bus 104 by actuating their associated switches 124. The controller 122 may be in communication with each of the switches 124 via communication link 125 to selectively connect or disconnect each of the loads 106 to the common bus 104. The controller 122 operates each of the switches 124 to connect each of the loads 106 according to the priority sequence and an available power from the gensets 102. In an embodiment, the switch 124 may be a circuit breaker.

Figure 2:
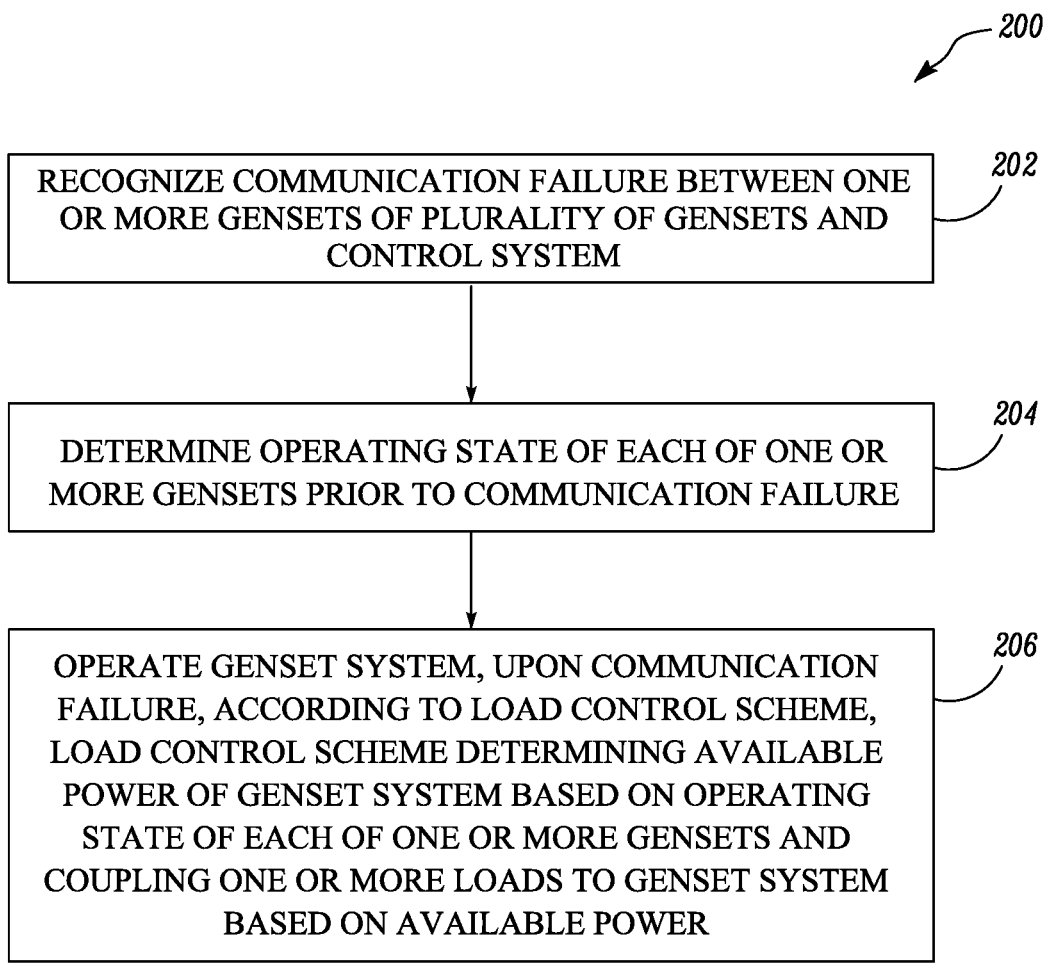
FIG. 2 illustrates, a method for operating the genset system, in accordance with an embodiment of the disclosure.

Turning to FIG. 2, one exemplary algorithm or method 200 by which the controller 122 of the control system 120 may be programmed to control and operate the genset system 100 is provided. Such an algorithm or set of instructions may be preprogrammed or incorporated into a memory 126 that is disposed within the controller 122 or is otherwise accessible by the controller 122. Furthermore, the controller 122 may be implemented using one or more of a processor, a microprocessor, a microcontroller, a digital signal processor (DSP), a field-programmable gate array (FPGA), an electronic control module (ECM), an electronic control unit (ECU), or any other suitable means for electronically engaging one or more tasks of the control system 120.

Also, the control system 120 utilizes the memory 126 for storing various instruction associated with the exemplary algorithm of method 200. Also, the memory 126 may record and store information about the operating state of each of the genset 102 received from each of the unit control device 114. Further, the memory 126 may store the priority order of connecting the loads 106 to the common bus 104. The memory 126 may be implemented using one or more of a volatile memory or a non-volatile memory. The memory 126 may include one or more of a read only memory (ROM), random access memory (RAM), a flash memory, an electronic erasable program read only memory (EEPROM), or other type of memory. The memory 126 may be removable from the network device, such as a secure digital (SD) memory card.

Specifically, as shown in FIG. 2, the controller 122 during an initial step 202 may be configured to determine whether a fail-safe condition should be triggered based on various operating characteristics of the genset system 100. For example, the controller 122 may be configured to recognize any loss of communication from one or more of the gensets 102 of the plurality of gensets 102 of FIG. 1. The controller 122 may periodically ping each of the gensets 102 in order to determine active communication between the controller 122 and each of the gensets 102. The controller 122 may recognize loss of communication with one or more gensets 102 when the controller 122 does not receive reply of the ping. Although, a ping message is used for recognizing the communication loss between the controller 122 and the gensets 102, it may be contemplated that other known techniques of identifying or recognizing a loss of communication may be utilized.

If no loss of communication is recognized during the step 202, the controller 122 may continue monitoring for such satisfying conditions and maintain normal operation of the genset system 100. If, however, a loss of communication is recognized, the controller 122 is configured to determine the operating state of each of those gensets 102 prior to the loss of communication, at a step 204.

Further, at the step 204, the controller 122 may determine the state of the engine control switch 116, the state of the synchronization switch 118, the state of the engine power output, the state of the warning events, the state of the engine shutdown event prior to the loss of communication from each of those gensets 102. Further, the controller 122 may compare the operating state of each of those gensets 102 with which communication is lost to a predefined state. In an exemplary embodiment, the predefined state corresponds to an operating state in which the engine control switch 116 is in the AUTO mode, the synchronization switch 118 is in the AUTO mode, the engine power output is at the rated power, the absence of the engine shutdown event, and the state of the one or more warning events is False i. e. there is absence of the warning events.

Further, at a step 206, the controller 122 automatically operate the genset system 100 according to a load control scheme based on the operating status of those gensets 102 with which communication is lost. The controller 122 calculates the available power of genset system 100 by adding power of the gensets 102 with which communication was not lost and the power of those gensets 102 with which the communication was lost and the operating state of those gensets 102, prior to communication failure, matches the predefined state. The genset 102 which has lost communication with the controller 122 and has the operating state corresponding to the predefined state may be referred as assumed to be online genset 102. Further, the gensets 102 with which communication is not lost may be referred as online gensets 102. In an embodiment, the controller 122 may utilize rated power of those online gensets 102 which are running (RUN mode) and connected to the common bus 104 to determine the available power of the genset system 100. In an embodiment, the controller 122 may utilize rated power of the online gensets 102 to determine the available power when the online gensets 102 are either running (RUN mode) or ready for operation (AUTO mode).

In an exemplary embodiment, when communication to all the gensets 102 has failed, the controller 122 may determine the available power based on rated power of those gensets 102 whose operating states corresponds to the predefined state. For example, out of the five gensets 102 shown in FIG. 2, only three gensets 102 have their operating state as the predefined state, the controller 122 adds the rated power of the three gensets 102 to calculate the available power from the genset system 100.

In another exemplary embodiment, the controller 122 may have lost communication with three of the five gensets 102. In such case, the controller 122 may determine the operating state of each of the three gensets 102 and determine the available power by adding the rated power of only those gensets 102 out of three gensets 102 whose operating state corresponds to the predefined state. Further, the controller 122 may add the rated power of the remaining two gensets 102 with which the controller 122 has not lost communication, in the total power of the assumed to be online genset 102 to calculate the available power of the genset system 100. The rated power of only those gensets 102 out of the remaining two online gensets 102 are added to the total power of the assumed to be online gensets 102, which are connected to the common bus 104 and running i.e. in the RUN mode.

Additionally or optionally, the controller 122 may determine the genset 102 having the highest rated power among the assumed to be online gensets 102. The controller 122 may subtract a value corresponding to the highest rated power from the available power calculated based on the rated power of the online gensets 102 and/or the assumed to be online gensets 102 to obtain the available power of the genset system 100. In an embodiment, the rated power of the all the gensets 102 may be equal. In such case, the available power may be calculated by subtracting the rated power of any of the genset 102 from the summation of the rated power i.e. a total rated power of the assumed to be online gensets 102 and/or the online gensets 102.

In another embodiment, an operator may select the genset 102 among the assumed to be online gensets 102. The rated power of the selected genset 102 is subtracted from the summation of the rated power i.e. the total rated power of the assumed to be online gensets 102 and/or the online gensets 102 to calculate the available power of the genset system 100. In an exemplary embodiment, the operator may select the genset 102 having second highest rated power among the assumed to be online gensets 102 to determine the available power of the genset system 100. In such a case, the controller 122 determines the available power by subtracting a value corresponding of the second highest rated power from the summation of rated power of the assumed to be online gensets 102 and/or the online gensets 102.

Further, at the step 206, the controller 122 connects the one or more loads 106 to the common bus 104 based on the available power of the genset system 100. The controller 122 may determine the available power of the genset system 100 by subtracting the operating power of the loads 106 already coupled to the common bus 104 before initiating coupling of additional loads 106 to the common bus 104.

The controller 122 may actuate the switch 124 associated with its load 106 for coupling the load 106 to the common bus 104. Each of the loads 106 may be sequentially connected with the common bus 104 according to the predefined priority sequence. The predefined priority sequence may be defined by the operator and stored in the memory 126. In an embodiment, the predefined priority sequence for connecting the loads 106 to the common bus 104 may be defined automatically by the controller 122. The controller 122 may define the priority sequence based on the type of loads and operation of the genset system 100.

Further, the loads 106 may be coupled to the common bus 104 based on the assumption that the first assumed to be online genset 102 is connected to the common bus 104 after a predetermined time of the communication failure with the controller 122. Thereafter each of the assumed to be online genset 102 is assumed to be connected to the common bus 104 sequentially after the predetermined time of coupling of the previous assumed to be online genset 102. The controller 122 may assume the connection of the assumed to be online gensets 102 is sequentially based on the rated power of those gensets 102. In an embodiment, the controller 122 may assume the connection of the assumed to be online gensets 102 sequentially starting from the genset 102 which e lowest rated power among the assumed to be online gensets 102.

In an exemplary embodiment, the predetermined time may be 10 seconds. In such case, the first assumed to be online genset 102 is assumed to be coupled to the common bus 104 after loss of communication of one or more gensets 102 with the controller 122. Thereafter, the controller 122 may connect the load 106 which is first in the priority sequence, according to the predefined priority sequence, based on the available power, determined using the rated powers of the online gensets 102 and the first assumed to be online genset 102, and the power needed to operate the load 106. Second assumed to be online genset 102 is assumed to be coupled to the common bus 104 after 10 seconds of assumed coupling of the first assumed to be online genset 102. The loads 106 may be coupled to the common bus 104, in the predefined priority sequence, based on the rated power of the online gensets 102 and first and second assumed to be online gensets 102, and the power needed to operate the loads 106. The connection to the remaining loads 106 proceeds in similar manner by assuming coupling of each of the additional assumed to be online gensets 102 after every 10 seconds. Also, the controller 122 may determine the available power of the genset system 100 by subtracting the operating power of the loads 106 already coupled to the common bus 104 before initiating coupling additional loads 106 to the common bus 104.

INDUSTRIAL APPLICABILITY

In general, the foregoing disclosure finds utility in any one of a variety of applications, which may benefit from improved balancing and connections of loads in the absence of discrete communications between particular components, modules, or subparts thereof. More specifically, the disclosed systems and methods may be used to automatically and adaptively aid in connecting loads, according a load control scheme, to a common bus of a genset system having two or more generator sets or gensets upon loss of communication between gensets and a controller of the genset system.

In particular, the disclosed control system and methods for controlling a genset system to provide better load connection to common bus in the absence of communications between the gensets of the genset system and the control system by adapting the load control scheme. More particularly, the load control scheme automatically manage the number of loads connected to the common bus, upon communication failure between one or more gensets and the control system, according to the operating state of those gensets prior to communication failure. The loads are connected or disconnected from the common bus based on the total available power of the genset system and the operating power of the loads according to the load control scheme. The present disclosure, thus, not only enables more effective use of the gensets during communication failures, but also enables the otherwise fixed operating nature of the gensets and also prevents overloading of the gensets and thereby preventing an impending failure of the genset system.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method for controlling a genset system, the method comprising:
   recognizing a data communication failure between one or more gensets of a plurality of gensets and a controller;
   receiving a state of an engine control switch, a synchronization switch, an engine power output, an engine shutdown event, and one or more warning events of each of the one or more gensets;
   determining an operating state of each of the one or more gensets prior to the communication failure based on the received state; and
   operating the genset system, upon the communication failure, according to a load control scheme, the load control scheme determining an available power of the genset system based on the determined operating state of each of the one or more gensets and coupling one or more loads to the genset system based on the available power.

2. The method of claim 1, wherein the available power, upon the communication failure, is determined by adding a rated power of each of the one or more gensets having the operating state corresponding to a predefined state.

3. The method of claim 2, wherein the
   predefined state corresponds to: an auto mode of an engine control switch;
   an auto mode of a synchronization switch;
   a rated power of an engine power output;
   an absence of an engine shutdown event; and
   an absence of one or more warning events.

4. The method of claim 1, wherein the available power is determined, upon the communication failure, by subtracting a rated power of a genset having a highest rated power from a total rated power of the one or more gensets, wherein the genset having the highest rated power is selected from the one or more gensets for which a communication failure is recognized and has an operating state which corresponds to a predefined state.

5. The method of claim 4, wherein the predefined state corresponds to:
   an auto mode of an engine control switch;
   an auto mode of a synchronization switch;
   a rated power of an engine power output;
   an absence of an engine shutdown event; and
   an absence of one or more warning events.

6. The method of claim 1, wherein the one or more loads are sequentially coupled to the genset system according to a predefined priority sequence.

7. The method of claim 6, wherein predefined priority sequence is automatically determined based on at least a type of the load.

8. A genset system comprising:
   a plurality of gensets;
   a common bus is configured to be coupled to each of the plurality of gensets and configured to communicate electrical power generated by the plurality of gensets to one or more loads;
   a control system in communication with the plurality of gensets, the common bus, and the one or more loads, the control system configured to
      recognize a data communication failure between one or more gensets of the plurality of gensets and the control system;
      recognizing a state of an engine control switch, a synchronization switch, an engine power output, an engine shutdown event, and one or more warning events of each of the one or more gensets;
      determine an operating state of each of the one or more gensets prior to the communication failure based on the recognized state; and
      operate the genset system, upon the communication failure, according to a load control scheme, the load control scheme determining an available power of the genset system based on the determined operating state of each of the one or more gensets and coupling the one or more loads to the common bus based on the available power.

9. The genset system of claim 8, wherein the control system is configured to determine the available power, upon the communication failure, by adding a rated power of each of the one or more gensets having the operating state corresponding to a predefined state.

10. The genset system of claim 9, wherein the
    predefined state corresponds to: an auto mode of an engine control switch;
    an auto mode of a synchronization switch;
    a rated power of an engine power output;
    an absence of an engine shutdown event; and
    an absence of one or more warning events.

11. The genset system of claim 8, wherein the control system is configured to determine the available power, upon the communication failure, by subtracting a rated power of a genset having a highest rated power from a total rated power of the one or more gensets, wherein the genset having the highest rated power is selected from the one or more gensets for which a communication failure is recognized and has an operating state which corresponds to a predefined state.

12. The genset system of claim 11, wherein the predefined state corresponds to: an auto mode of an engine control switch;
    an auto mode of a synchronization switch;
    a rated power of an engine power output;
    an absence of an engine shutdown event; and
    an absence of one or more warning events.

13. The genset system of claim 8, wherein the one or more loads are sequentially coupled to the common bus according to a predefined priority sequence.

14. The genset system according to claim 13, wherein predefined priority sequence is automatically determined based on at least a type of the load.

15. A control system for controlling a genset system, the control system comprising: a controller in communication with a plurality of gensets, a common bus, one or more loads, the controller configured to
    recognize a data communication failure between one or more gensets of the plurality of gensets and the controller;

recognize a state of an engine control switch, a synchronization switch, an engine power output, an engine shutdown event, and one or more warning events;

determine an operating state of each of the one or more gensets prior to the communication failure based on the recognized state; and operate the genset system, upon the communication failure, according to a load control scheme, the load control scheme determining an available power of the genset system based on the determined operating state of each of the one or more gensets and coupling the one or more loads to the common bus based on the available power.

16. The control system of claim 15, wherein the controller is configured to determine the available power, upon the communication failure, by adding a rated power of each of the one or more gensets having the operating state corresponding to a predefined state.

17. The control system of claim 16, wherein the predefined state corresponds to: an auto mode of an engine control switch;

an auto mode of a synchronization switch;

a rated power of an engine power output;

an absence of an engine shutdown event; and an absence of one or more warning events.

18. The control system of claim 15, wherein the one or more loads are sequentially coupled to the common bus according to a predefined priority sequence.

19. The control system of claim 18, wherein predefined priority sequence is automatically determined based on at least a type of the load.

20. The control system of claim 15, wherein the plurality of gensets are coupled to the common bus to transfer electrical power generated by the plurality of gensets to the one or more loads.

* * * * *